United States Patent [19]

Mizushima

[11] 4,188,815
[45] Feb. 19, 1980

[54] DIE CHANGING APPARATUS FOR A BENDING BRAKE

[75] Inventor: Akira Mizushima, Komatsu, Japan

[73] Assignee: Kabushiki Kiasha Komatsu Seisakusho, Tokyo, Japan

[21] Appl. No.: 943,967

[22] Filed: Sep. 20, 1978

[30] Foreign Application Priority Data

Oct. 14, 1977 [JP] Japan ................... 52-123272

[51] Int. Cl.² ............................................ B21D 37/14
[52] U.S. Cl. ........................................ 72/446; 29/568; 72/389; 83/563
[58] Field of Search ................. 72/446, 447, 448, 389; 29/568; 83/563, 549, 552

[56] References Cited

U.S. PATENT DOCUMENTS

| 3,816,904 | 6/1974 | Herb | 83/563 |
|---|---|---|---|
| 3,921,887 | 11/1975 | Maehara | 72/446 |
| 4,020,668 | 5/1977 | Doudet | 72/446 |
| 4,103,414 | 8/1978 | Herb | 29/568 |

*Primary Examiner*—Francis S. Husar
*Assistant Examiner*—Gene P. Crosby

*Attorney, Agent, or Firm*—Armstrong, Nikaido, Marmelstein & Kubovcik

[57] ABSTRACT

Apparatus incorporated in a bending brake for making selective use of a preselected number of different dies which are to cooperate with reciprocating punches to make various bending operations. The dies are held in respective preassigned storage locations formed by a pair of racks jointly movable in the vertical direction. Disposed opposite to the rack pair of horizontal movement toward and away from same are a pair of die carriers which coact to carry a desired one of the dies out of the rack pair. A pair of die changer arms, pivotally mounted on the frame of the bending brake, transport a die to be replaced, which has been in use on a die bed, from the later on to the die carrier pair and, on their return stroke, transport the desired die which has been just carried out of the rack pair by the die carrier pair from the later on to the die bed. Comprising a set of electrical switches, a die identifier mechanism ascertains the identity of the replaced die and causes the rack pair to receive the replaced die in its preassigned storage location as same is subsequently carried back therein by the die carrier pair. Fluid actuated cylinders under the control of solenoid valves are employed for automatic operation of the apparatus.

11 Claims, 29 Drawing Figures

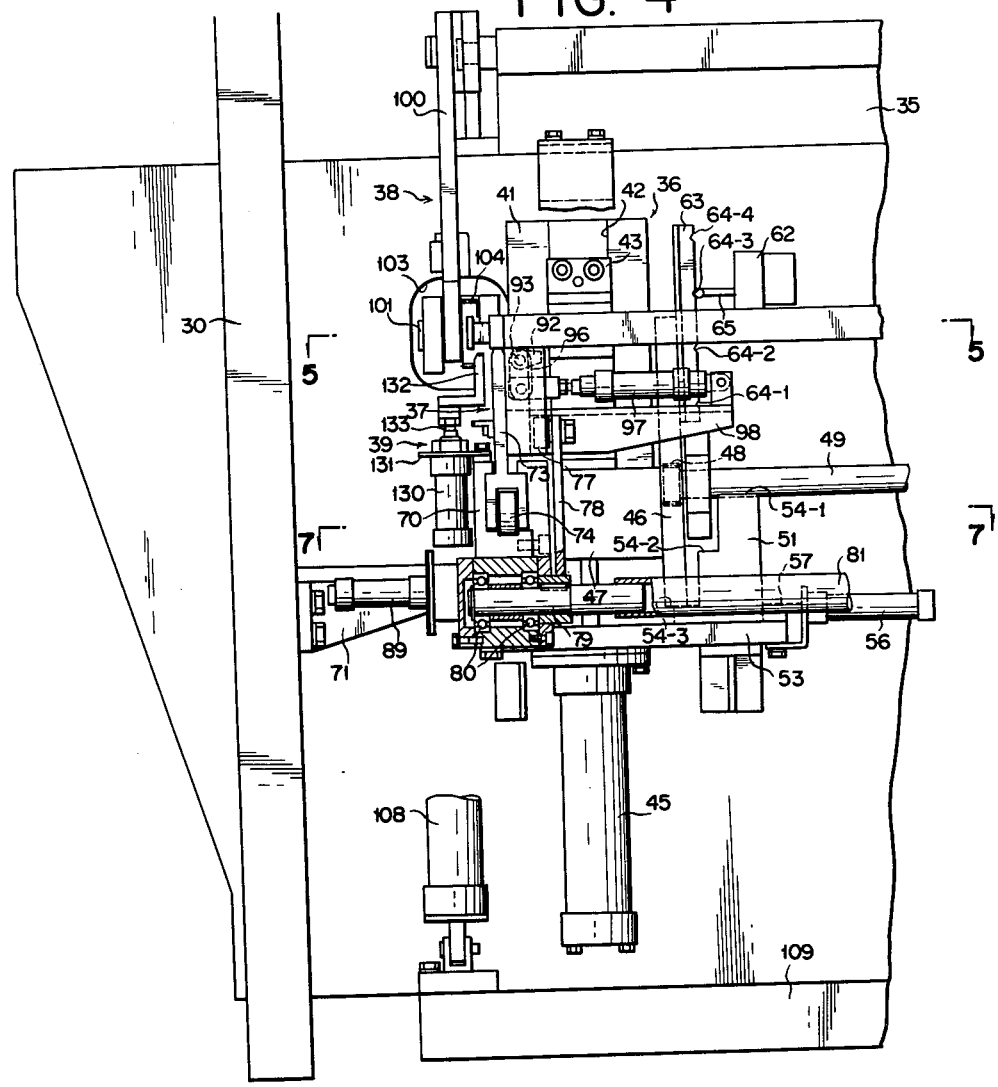

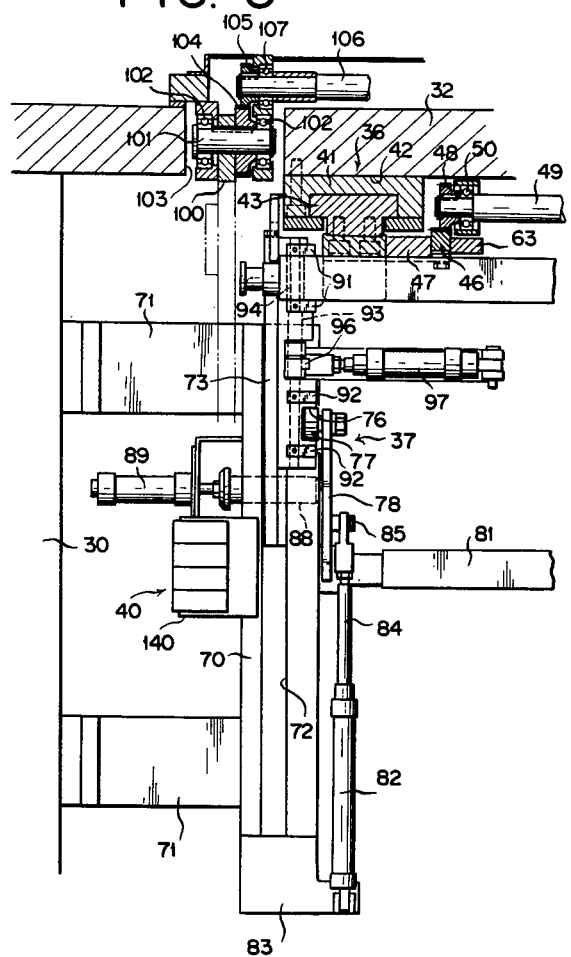

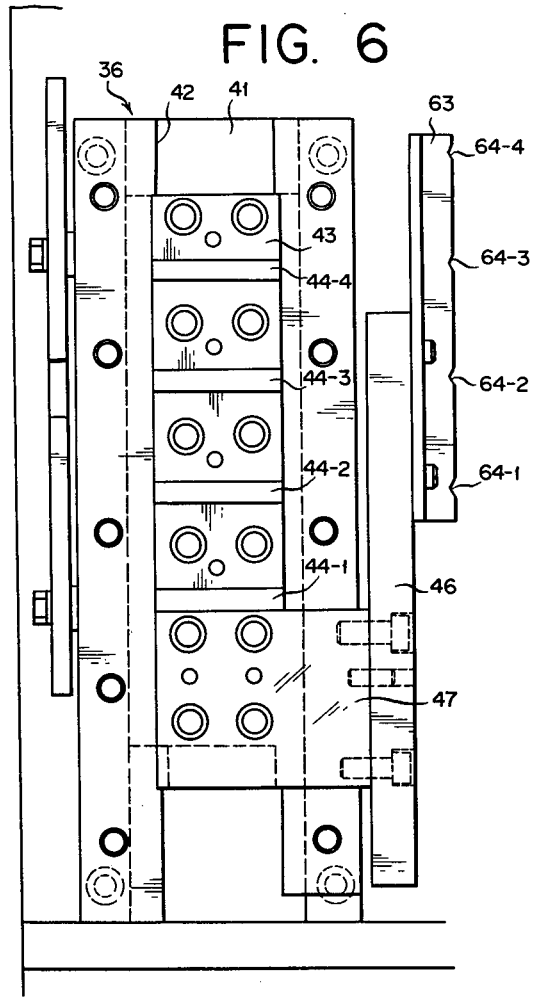

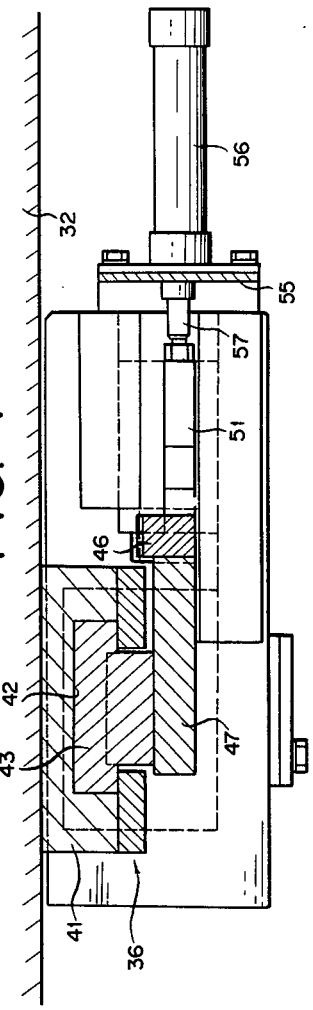
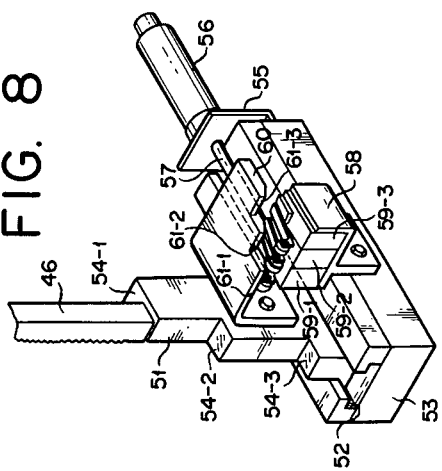

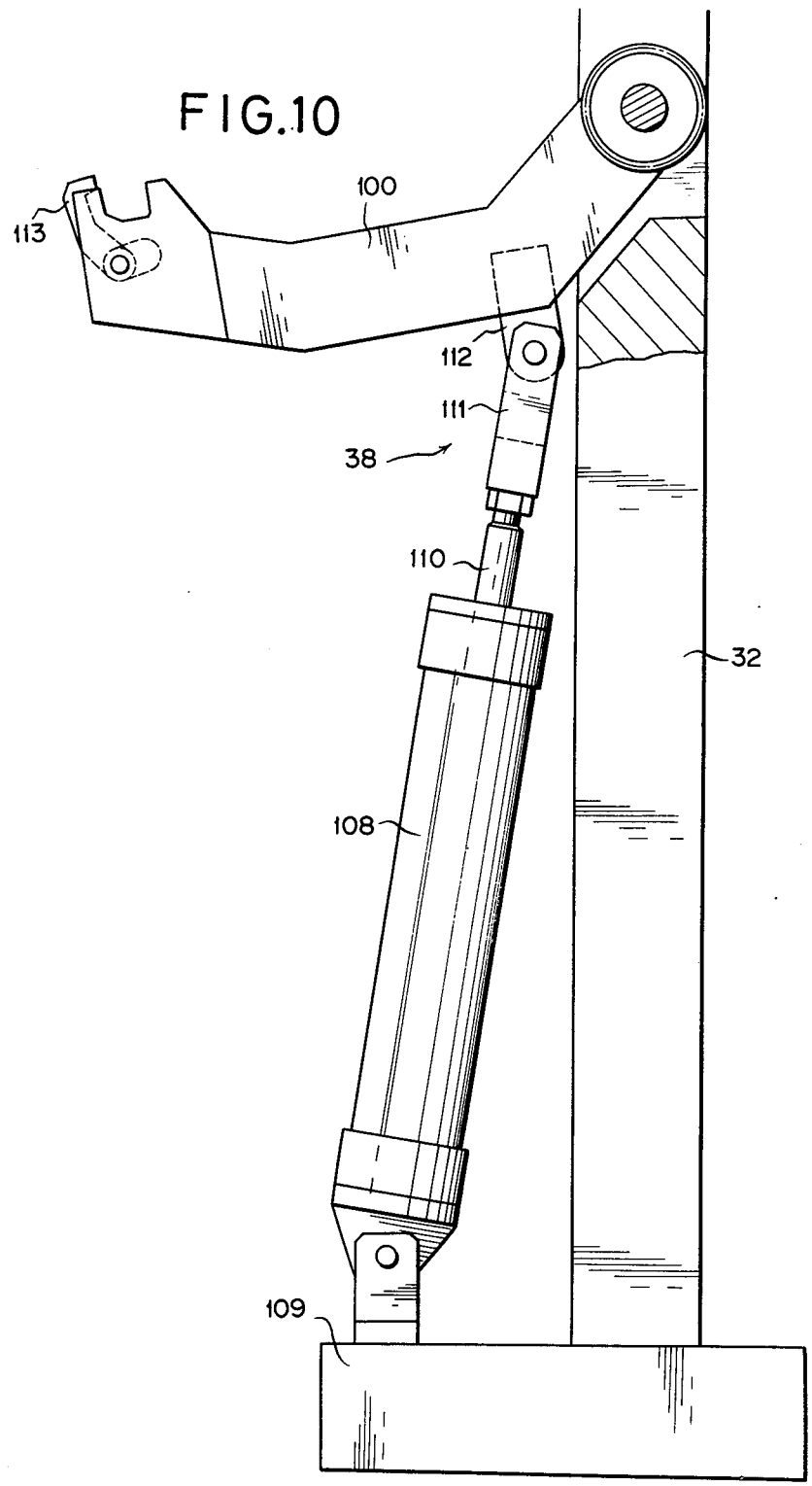

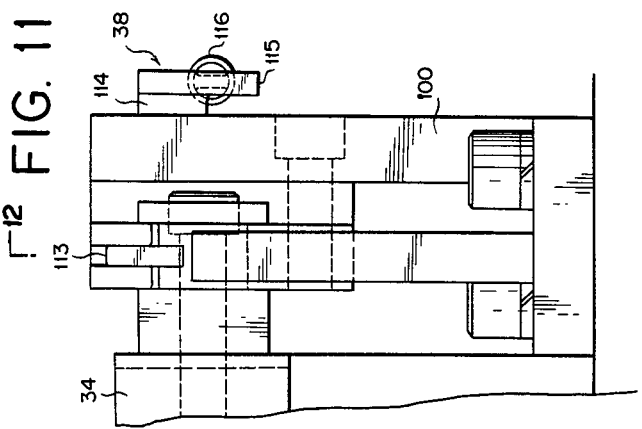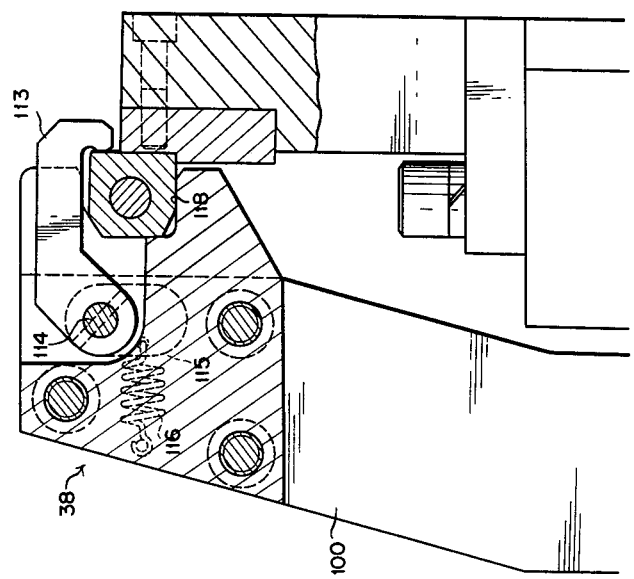

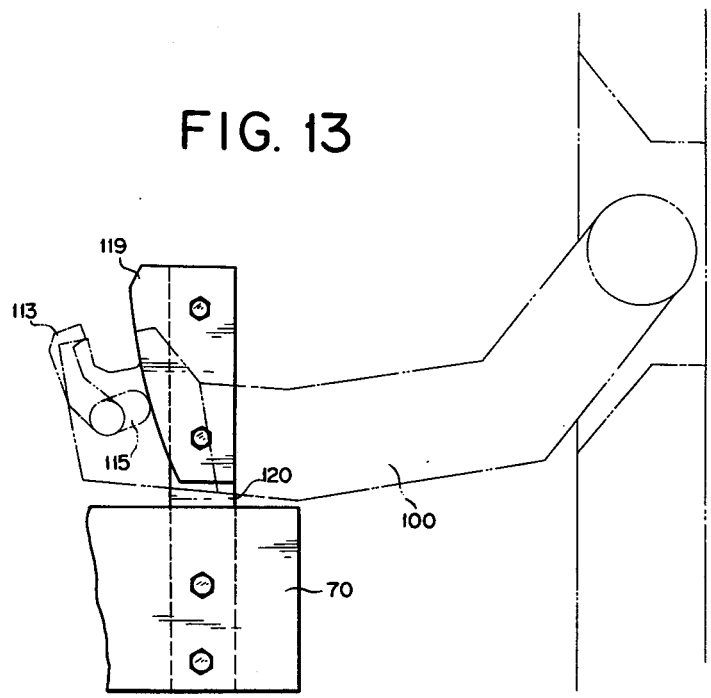

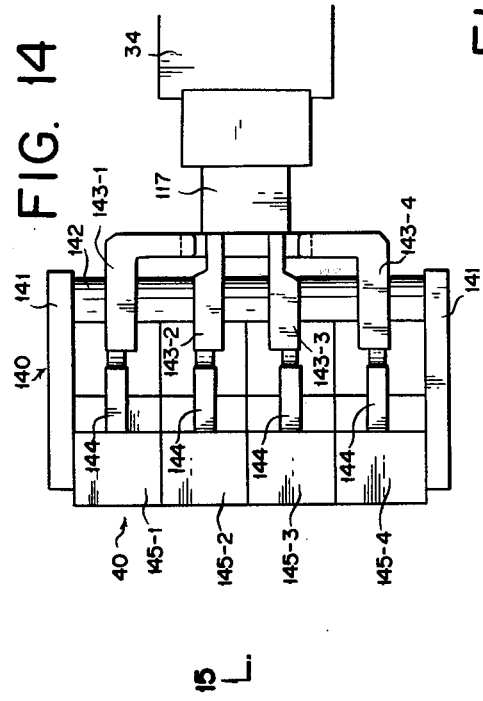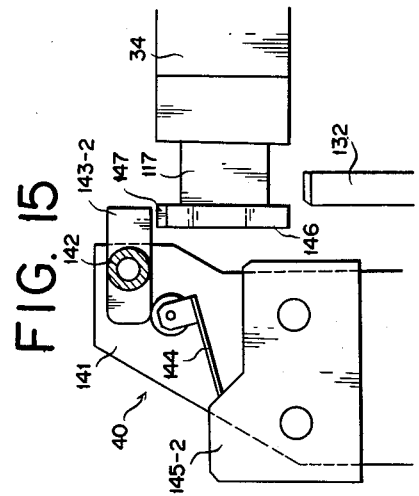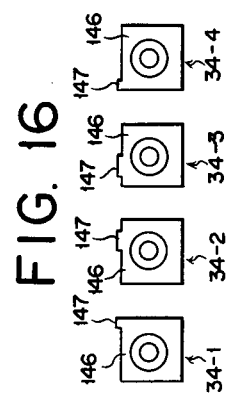

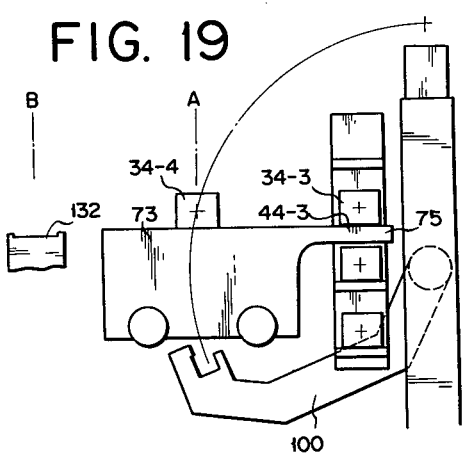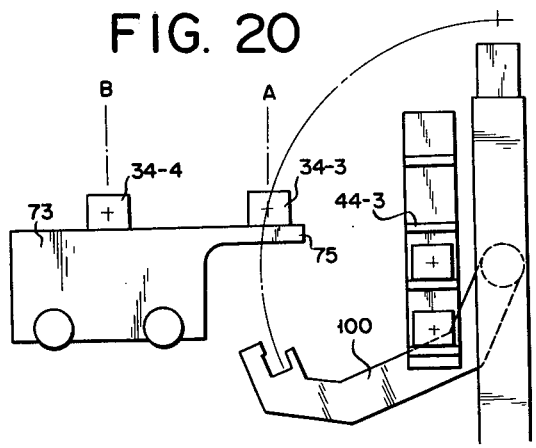

FIG. 23
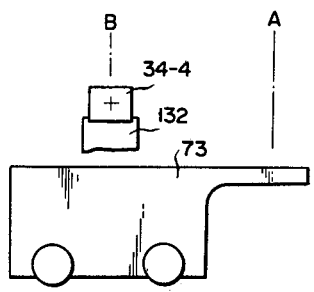
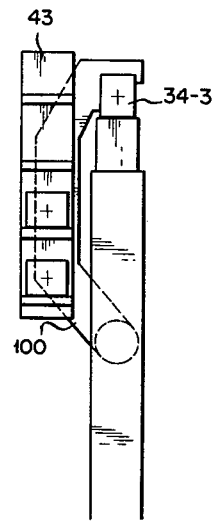
FIG. 24
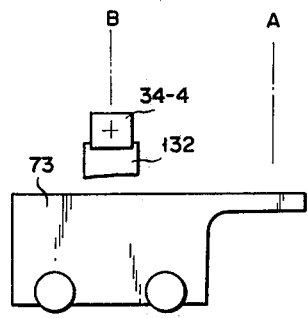
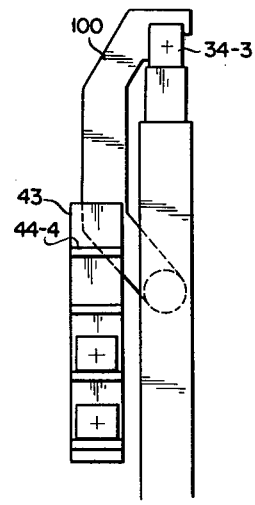

FIG. 25
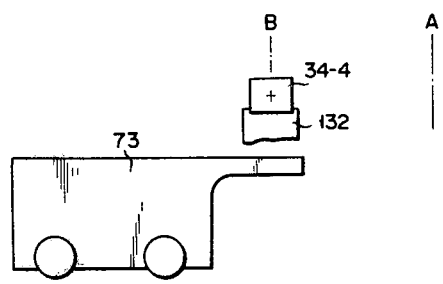 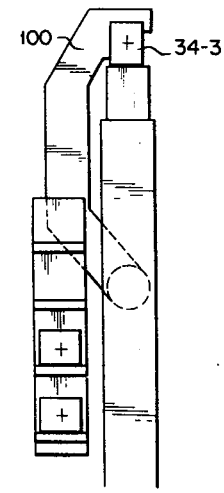
FIG. 26
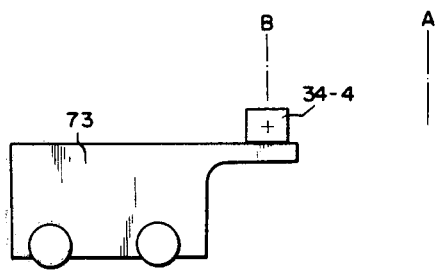 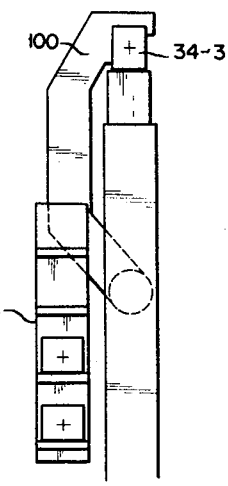

DIE CHANGING APPARATUS FOR A BENDING BRAKE

BACKGROUND OF THE INVENTION

1. Field of the Invention

This invention pertains to bending brakes, known also as press brakes, that are used for sheet-metal bending or forming operation, and in particular to bending brakes of the type having a stationary die and a reciprocating punch. Still more particularly, the invention is directed to die changing apparatus for a bending brake of the type specified whereby a preselected number of interchangeable dies can be put to use in any desired sequence to enable the brake to perform a succession of different bending operations.

2. Description of the Prior Art

Bending brakes as heretofore constructed have usually been equipped with no means for automatically changing dies for different bending operations. Conventionally, therefore, a desired number of dies have been kept in stock externally of the bending brake and, as required, have been manually selectively installed in position on the machine. This conventional practice is of course objectionable in view of much labor involved and considerable downtime imposed on the machine for each die changing operation.

SUMMARY OF THE INVENTION

It is an object of this invention to provide die changing apparatus incorporated in a bending brake to enable same to make selective use of a preselected number of interchangeable dies for different bending or forming operations.

Another object of the invention is to provide die changing apparatus which requires a minimum of time for each die changing operation.

Another object of the invention is to provide die changing apparatus which lends itself to easy automation and which, if automated, will require little attention from an operator.

In summary, the die changing apparatus according to the invention includes rack means movably mounted on frame means and adapted to hold a preselected number of interchangeable dies in respective storage locations therefor. Disposed opposite to the rack means for movement toward and away from same, die carrier means is adapted to carry a desired one of the dies out of its preassigned storage location in the rack means. Die changer means transports a die to be replaced, which has been in use on a die bed for bending operation, from the die bed on to the die carrier means and further transports the desired die, which has been carried out of the rack means by the die carrier means, from the latter on to the die bed. Also included is die identifier means for ascertaining the identity of the replaced die and for causing the rack means to receive the replaced die in its preassigned storage location as the replaced die is subsequently carried back into the rack means by the die carrier means.

In a preferred embodiment, the rack means comprises a pair of racks mounted on the frame means for joint movement in the vertical direction relative to same and adapted to hold the preselected number of dies in a vertical series, with each die extending horizontally. The movement of the rack pair in the vertical direction is arrested in several predetermined positions for permitting the die carrier means to carry a desired die out of its preassigned storage location in the rack pair and to carry the replaced die back into its preassigned storage location therein.

The die carrier means also comprises a pair of die carriers mounted on the frame means for joint movement in the horizontal direction toward and away from the rack pair. The die carrier pair has first and second die rests formed thereon. The movement of the die carrier pair is arrested in three predetermined positions: a first position where the desired die in the rack pair overlies the first die rests of the die carrier pair and where the die to be replaced is deposited on the second die rests thereof by the die changer means; a second position, away from the rack pair, where the desired die is transported from the first die rests on to the die bed by the die changer means and where the replaced die is identified by the die identifier means; and a third position, farther away from the rack pair, where the replaced die is placed on the first die rests to be carried back into its preassigned storage location in the rack pair.

According to a further feature of the invention, the die changing apparatus includes die lifter means for lifting the replaced die from the second die rests of the die carrier pair when the latter is moved from the first to the second position and for lowering the replaced die on to the first die rests of the die carrier pair when the latter is subsequently moved from the second to the third position. The identity of the replaced die is ascertained by the die identifier means when the replaced die is lifted from the second die rests of the die carrier pair by the die lifter means.

The die identifier means comprises a set of electrical switches which are to be selectively actuated by the replaced die when the latter is lifted as above from the second die rests of the die carrier pair. For thus selectively actuating the switches, a small projection is formed in a different, characteristic position on a flange on one end of each die. One of the switches corresponding to the particular replaced die is actuated by its projection, with the result that the rack pair is moved to one of the predetermined positions for receiving the replaced die in its preassigned storage location as the replaced die is subsequently lowered on to the first die rests of the die carrier pair and is thereby carried back into the rack pair.

The above and other objects, features and advantages of this invention and the manner of attaining them will become more clearly apparent, and the invention itself will best be understood, from the following description of a preferred embodiment which is to be read with reference to the accompanying drawings.

BRIEF DESCRIPTION OF THE DRAWINGS

FIG. 4 is a partial rear elevational view, with parts omitted and parts sectioned for clarity, showing the die changing apparatus as seen in the direction of the arrow 4 in FIG. 3;

FIG. 5 is a horizontal sectional view taken along the line 5—5 in FIG. 4;

FIG. 6 is an enlarged elevational view of one of the pair of rack assemblies of the die changing apparatus;

FIG. 7 is an enlarged horizontal sectional view taken along the line 7—7 in FIG. 4 and also showing one of the pair of rack assemblies;

FIG. 8 is a perspective view of the means incorporated in each rack assembly for arresting the movement of the rack in several predetermined positions;

FIG. 10 is an enlarged elevational view, partly sectioned for clarity, of one of the pair of die changer mechanisms of the die changing apparatus;

FIG. 11 is a partial, enlarged elevational view of the die changer mechanism as seen in the direction of the arrow 11 in FIG. 3;

FIG. 12 is a vertical sectional view taken along the line 12—12 in FIG. 11 and also showing the die changer mechanism;

FIG. 13 is a partial elevational view showing the cam of FIG. 9 as seen in the direction of the arrow 13 therein, the view being explanatory of the operative relationship between the cam and the die changer mechanism of FIGS. 10 through 12;

FIG. 14 is an enlarged plan view of the die identifier mechanism of the die changing apparatus;

FIG. 15 is a vertical sectional view taken along the line 15—15 in FIG. 14 and also showing the die identifier mechanism;

FIG. 16 is an end elevational view of the interchangeable dies for use with the die changing apparatus;

FIGS. 18 through 29 are a series of schematic representations of the die changing apparatus which are explanatory of the sequential steps of its operation.

DESCRIPTION OF THE PREFERRED EMBODIMENT

General

Figure 1:
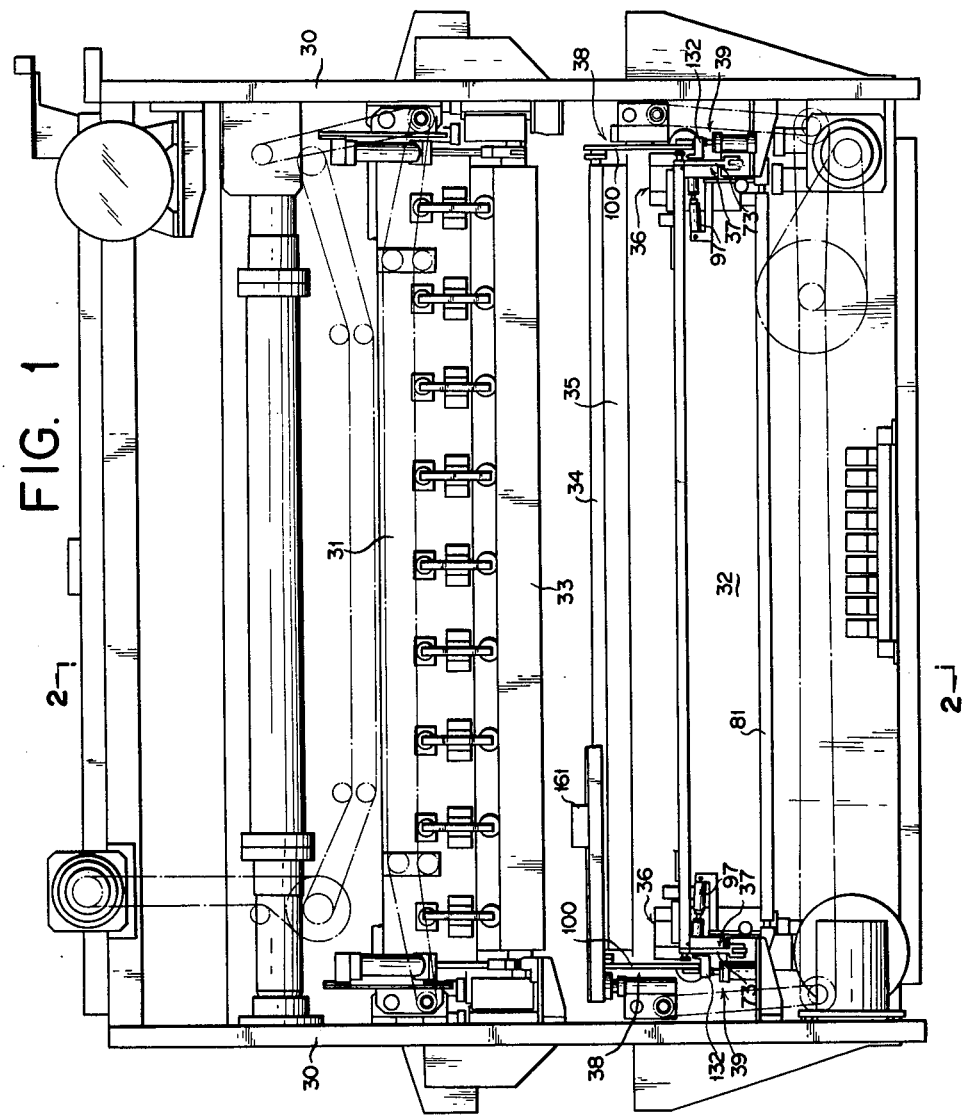
FIG. 1 is a rear elevational view of the bending brake incorporating a preferred form of the die changing apparatus according to this invention.
Figure 2:
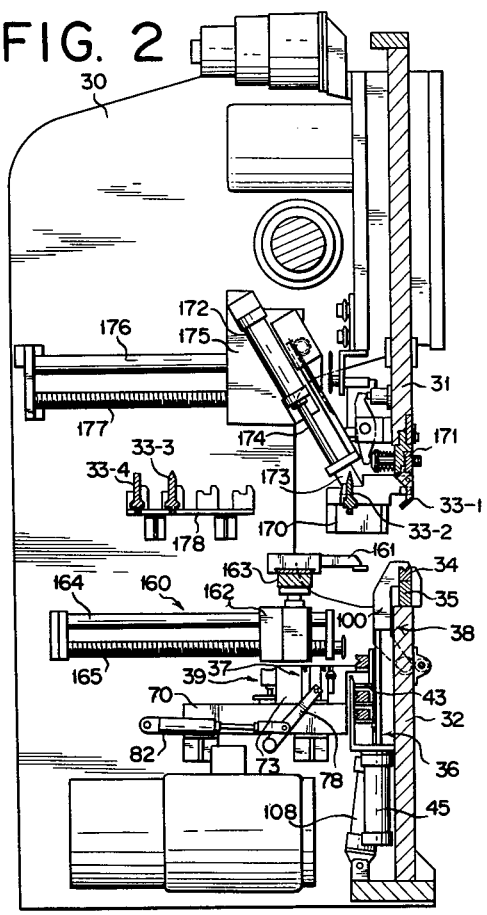
FIG. 2 is a vertical sectional view taken along the line 2—2 in FIG. 1.

In FIGS. 1 and 2 is shown, in its entirety, the bending brake incorporating the die changing apparatus according to the invention. The bending brake has a frame including a pair of confronting side walls 30. Between these side walls 30, and at the front of the brake, there are mounted a reciprocating ram 31 and an apron 32 lying in a common vertical plane.

A punch 33 (designated 33-1 in FIG. 2) is carried by the ram 31 so as to extend horizontally along its bottom edge, as will be later explained in more detail. A die 34 is fixedly but replaceably mounted on a horizontally elongated bed 35 which in turn is fixedly mounted on the top of the apron 32. The reciprocating punch 33 and the stationary die 34 coact in the well known manner to perform bending or forming operations.

In accordance with this invention the die 34 on the bed 35 can be replaced by any selected one of other dies kept in stock within the brake. Toward this end the brake is equipped with the die changing apparatus comprising: a pair of rack assemblies 36, each disposed on or adjacent one side of the brake frame, for holding a preselected number of interchangeable dies in respective preassigned storage locations therefor; a pair of die carrier mechanisms 37, each disposed opposite to and rearwardly of one of the rack assemblies 36, for carrying a desired one of the dies out of the rack assemblies; a pair of die changer mechanisms 38 for transporting the die 34 to be replaced from the bed 35 on to the die carrier mechanisms 37 and for transporting the desired die from the die carrier mechanisms on to the die bed; a pair of die lifter mechanisms 39 for temporarily lifting the replaced die 34 from the die carrier mechanisms 37; and a die identifier mechanism 40 (FIG. 3) for identifying the replaced die 34, while same is being lifted from the die carrier mechanisms 37, and for causing the rack assemblies 36 to receive the replaced die in its preassigned storage location.

The above enumerated assemblies and mechanisms will hereinafter be described in detail under the respective headings. Since each pair of assemblies or mechanisms are essentially of identical construction, only one of them will be described, except where otherwise noted specifically, it being understood that the same description is applicable to the other assembly or mechanism.

Rack Assemblies

Figure 3:
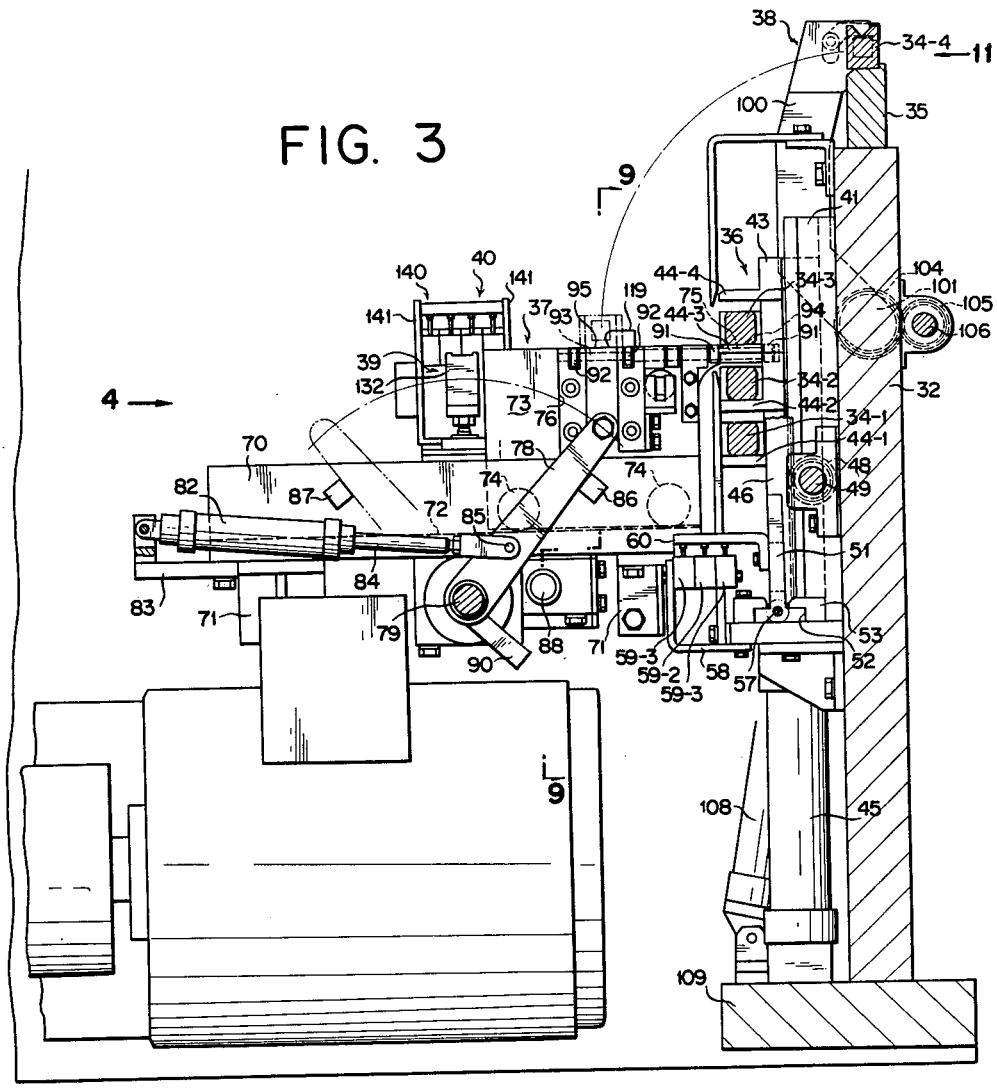
FIG. 3 is an enlarged vertical sectional view, with parts omitted and parts broken away for clarity, similar to FIG. 2 but showing only the die changing apparatus.

As shown in FIGS. 3, 4 and 5 and on an enlarged scale in FIG. 6, each rack assembly 36 includes a guide structure 41 secured to the rear surface of the apron 32. The guide structure 41 is adapted to define an undercut groove or guideway 42 extending vertically. Slidably fitted in this guideway 42, for up-and-down motion relative to the brake frame, is a rack 43 having a plurality of, four in this embodiment, shelves 44-1, 44-2, 44-3 and 44-4 projecting rearwardly therefrom in vertically spaced relationship to each other.

The shelves 44-1 through 44-4 of the rack assembly pair 36 are intended to support four interchangeable dies at points adjacent the opposite ends thereof so that the dies may each extend horizontally and may be arranged in a vertical series. The four interchangeable dies are labelled 34-1, 34-2, 34-3 and 34-4, respectively, in FIG. 3. In the following description the reference numeral 34 will be employed to denote generically any of these interchangeable dies 34-1 through 34-4.

The storage locations provided by the shelves 44-1 through 44-4 of the rack assembly pair 36 are assigned to the respective dies 34-1 through 34-4. In FIG. 3 is shown the fourth die 34-4 taken out of its preassigned storage location on the fourth or uppermost shelves 44-4 and mounted in position on the die bed 35 to perform a desired bending operation.

A fluid actuated cylinder 45 (hereinafter referred to as the rack cylinder), mounted in fixed relationship to the apron 32, has its piston rod coupled directly to the rack 43 of each rack assembly 36 to impart the desired up-and-down motion thereto. An upstanding rack or toothed bar 46 is fastened via a connector 47 to the rack 43 for simultaneous up-and-down motion therewith. The toothed bar 46 is in mesh with a pinion 48 (FIG. 5) fixedly mounted on one end of a shaft 49 rotatably journalled in a bearing 50. The shaft 49 serves to interconnect the pinions 48 of the rack assembly pair 36. It is thus seen that the up-and-down motion of the rack pair 43 is precisely synchronized.

With reference directed also to FIGS. 7 and 8, a movable stop 51 is provided under the toothed bar 46 for arresting the downward motion of the rack 43 precisely in predetermined positions to be explained presently. The movable stop 51 is slidably engaged in an undercut groove or guideway 52 formed by a guide structure 53 secured to the apron 32, with the guideway extending horizontally. The movable stop 51 is shown to have three abutments 54-1, 54-2 and 54-3 formed stepwise thereon along the guideway 52.

Bracketed at 55 to the guide structure 53 is a fluid actuated cylinder 56 (hereinafter referred to as the stop cylinder) having its piston rod 57 coupled to the movable stop 51. This movable stop is therefore moved by the stop cylinder 56 along the guideway 52 in order that, on its downward travel, the toothed bar 46 may come to rest on a desired one of the three abutments 54-1 through 54-3 of the movable stop or may descend past all the abutments.

FIGS. 3 and 8 further illustrate a bracket 58 fastened only to the illustrated guide structure 53 and supporting three limit switches 59-1, 59-2 and 59-3 in side-by-side arrangement. For actuation of these limit switches an L-shaped plate member 60 is fastened to the movable stop 51 in overhanging relationship to the switches. The plate member 60 is recessed as shown in FIG. 8 to provide three actuating edges 61-1, 61-2 and 61-3. The limit switch 59-1 is actuated by the plate edge 61-1 when the movable stop 51 is moved to a position where its lowermost abutment 54-3 lies under the toothed bar 46. The limit switch 59-2 is actuated by the plate edge 61-2 when the movable stop 51 is moved to a position where its intermediate abutment 54-2 lies under the toothed bar 46. The limit switch 59-3 is actuated by the plate edge 61-3 when the movable stop 51 is moved to a position where its uppermost abutment 54-1 lies under the toothed bar 46.

Another limit switch 62 seen in FIG. 4 is intended for confirmation of the fact that the rack 43 is stopped in any of the four predetermined positions. For actuation of this limit switch 62 an upstanding bar 63 is fastened to the toothed bar 46. The bar 63 has four vertically spaced notches 64-1, 64-2, 64-3 and 64-4 formed in its edge disposed for sliding engagement with the actuator arm 65 of the limit switch 62. Representing the four predetermined positions in which the rack 43 is to be stopped, the notches 64-1 through 64-4 are effective to cause the limit switch 62 to generate an electrical confirmation signal each time the rack is stopped precisely in one of the predetermined positions.

Die Carrier Mechanisms

Figure 9:
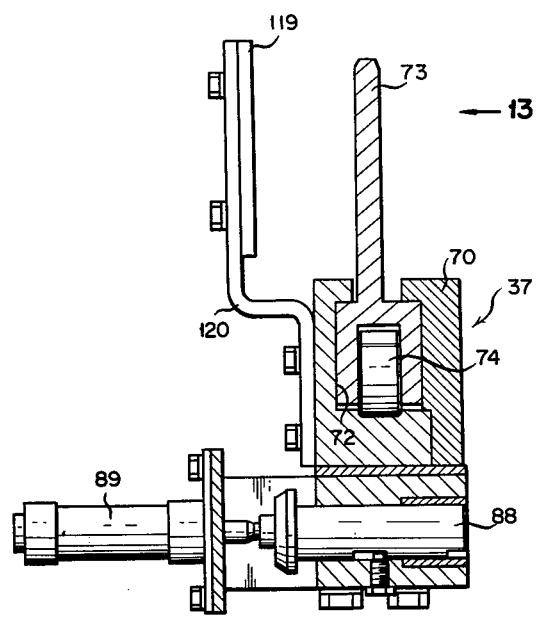
FIG. 9 is an enlarged vertical sectional view taken along the line 9—9 in FIG. 3 and showing one of the pair of die carrier mechanisms of the die changing apparatus, the view also showing a cam mounted on the die carrier mechanism.

Each of the pair of die carrier mechanisms 37 includes a guide structure 70, seen in FIGS. 3, 4 and 5 and shown on an enlarged scale in FIG. 9, that is mounted on one of the side walls 30 of the brake frame via a pair of brackets 71. Disposed opposite to one of the pair of rack assemblies 36, the guide structure 70 defines an undercut groove or guideway 72 extending horizontally in the front-to-rear depth direction of the bending brake.

Engaged in the guideway 72 is a die carrier 73 having a pair of rollers 74 for rolling movement therealong. The die carrier 73 has a tongue 75 projecting forwardly therefrom for carrying a desired one of the dies 34-1 through 34-4 out of and back into the rack 43. On one of the side faces of the die carrier 73 a vertical groove 76 is formed in which there is operatively engaged a roller 77 rotatably mounted on one end of a die carrier drive lever 78. This drive lever is keyed at the other end to a spindle 79 rotatably journalled in a pair of bearings 80 (FIG. 4) supported under the guide structure 70. It will be seen from FIG. 4 that the spindles 79 of the die carrier mechanism pair 37 are rigidly interconnected via a shaft 81 for joint rotation.

A fluid actuated cylinder 82 (hereinafter referred to as the die carrier cylinder) is pivotally mounted on a bracket 83 fastened to the guide structure 70. The piston rod 84 of the die carrier cylinder 82 is pivotally pinned at 85 to the drive lever 78. With the extension and contraction of the die carrier cylinder 82, therefore, the drive lever 78 reciprocates to cause the die carrier 73 to roll along the guideway 72 toward and away from the rack assembly 36.

The die carrier 73 is required to stop in three different positions on the guide structure 70, i.e., a first or front position (FIG. 3), a second or intermediate position (FIGS. 20 through 24), and a third or rear position (FIGS. 25 and 26). Two fixed stops 86 and 87 project from the guide structure 70 for arresting the travel of the die carrier 73 in the front and the rear positions, respectively, by engaging the drive lever 78. For arresting the travel of the die carrier 73 in the intermediate position, a retractable stop 88 is slidably supported under the guide structure 70. The retractable stop 88 is coupled directly to the piston rod of a fluid actuated cylinder 89 (hereinafter referred to as the retractable stop cylinder). Upon extension of this retractable stop cylinder 89, the retractable stop 88 is shifted to its working position for engaging a short lever 90 extending from the pivoted end of the drive lever 78.

A first or front pair of retractable die retainer pawls 91 and a second or rear pair of retractable die retainer pawls 92 are fixedly mounted on a rotatable shaft 93 mounted on the die carrier 73 and extending along its top edge. Spaced in the longitudinal direction of the die carrier 73, the front 91 and the rear 92 pairs of die retainer pawls are effective to form front 94 and rear 95 die rests at those top edge portions of the die carrier 73 which lie therebetween.

The shaft 93 supporting the front 91 and the rear 92 pairs of die retainer pawls thereon is operatively coupled via a link 96 to the piston rod of a fluid actuated cylinder 97 (hereinafter referred to as the die retainer cylinder). The die retainer cylinder 97 is pivotally mounted on a bracket 98 fastened to the die carrier 73. In FIGS. 3 through 5 the die retainer cylinder 97 is shown extended to hold both the front 91 and the rear 92 pairs of die retainer pawls retracted. The die retainer pawl pairs 91 and 92 are to be pivoted upwardly upon contraction of the die retainer cylinder 97, for retaining the dies 34 placed upon the die rests 94 and 95.

Die Changer Mechanisms

One of the pair of die changer mechanisms 38 is seen in FIGS. 3, 4 and 5 and is further shown on enlarged scales in FIGS. 10, 11, 12 and 13. Each die changer mechanism 38 includes a die changer arm 100 fixedly mounted at one end on a rotatable spindle 101 for swinging motion in a vertical plane. The spindle 101 has its opposite ends rotatably journalled in a pair of bearings 102 (FIG. 5) supported in an opening 103 formed in the apron 32. Also mounted on the spindle 101 is a gear 104 which is in mesh with a pinion 105 on one end of a shaft 106 rotatably mounted on the apron 32 via a bearing 107. Arranged forwardly of the apron 32, the shaft 106 serves to interconnect the two die changer mechanisms 38 and to synchronize the swinging motion of their die changer arms 100.

As clearly shown in FIG. 10, a fluid actuated cylinder 108 (hereinafter referred to as the die changer cylinder) is pivotally mounted on a pedestal 109 of the apron 32. The piston rod 110 of the die changer cylinder 108 is coupled to a link 111 which in turn is pivoted to another link 112 secured to the die changer arm 100. The die changer arm 100 is to be swung by the die changer cylinder 108 for transporting the dies 34-1 through 34-4 between the die bed 35 and the die carrier pair 73.

In FIGS. 11 and 12 is shown a die clamping arm or hook 113 fixedly mounted on a pivot pin 114 rotatably supported on the free end of the die changer arm 100. Also fixedly mounted on the pivot pin 114 is a cam follower lever 115 to which there is connected a helical extension spring 116. The die clamping hook 113 is biased by the extension spring 116 in a direction such that the grip 117 (FIG. 15) projecting from each end of each die 34 is caught by the hook and thereby urged against a recess 118 formed in the die changer arm 100.

With reference to FIGS. 9 and 13, a cam 119 is fastened to the guide structure 70 via a bracket 120. When the die changer arm 100 is swung to the position shown in FIG. 13, the cam follower lever 115 rides over the cam 119 and is thereby pivoted against the bias of the extension spring 116. The die grip 117 is thus released by the clamping hook 113, and the die itself to be replaced is deposited on the rear die rests 95 of the die carrier pair 73.

Die Lifter Mechanisms

As seen in FIGS. 3 and 4, each of the pair of die lifter mechanisms 39 includes a fluid actuated cylinder 130 (hereinafter referred to as the die lifter cylinder) bracketed at 131 to the guide structure 70 of the die carrier mechanism 37. A die support 132 is secured to the piston rod 133 of the die lifter cylinder 130.

The die lifter mechanism 39 of the above construction is disposed by the side of the rear die rest 95 of the die carrier 73 when the latter is in the intermediate position, and by the side of the front die rest 94 when the die carrier is in the rear position. When the pair of die carriers 73 are in the intermediate position, the die 34 on their second die rests 94 is to be lifted therefrom by the pair of die lifter mechanisms 39.

Die Identifier Mechanism

The die identifier mechanism associated with the illustrated die lifter mechanism 39 is seen in FIGS. 3 and 5 and is shown on an enlarged scale in FIGS. 14 and 15. The die identifier mechanism 40 includes a supporting frame 140 including a pair of confronting walls 141. Extending between these walls 141 is a pivot pin 142 on which there are mounted first 143-1, second 143-2, third 143-3 and fourth 143-4 identifier arms for independent pivotal motion in vertical planes. Each of the identifier arms 143-1 through 143-4 has one of its ends arranged for engagement with the actuator arm 144 of the corresponding one of first 145-1, second 145-2, third 145-3 and fourth 145-4 limit switches mounted between the pair of walls 141 of the supporting frame 140. The other ends of the identifier arms 143-1 through 143-4 are arranged for selective actuation by a rectangular flange 146 on the grip 117 of each die 34 lifted by the pair of die lifter mechanisms 39.

As shown in FIG. 16, the flanges 146 of the interchangeable dies 34-1 through 34-4 have projections 147 formed in different positions on their corresponding edges. The position of each projection 147 is characteristic of one of the dies 34-1 through 34-4. Thus, for example, when the fourth die 34-4 is lifted by the die lifter mechanism pair 39, the fourth identifier arm 143-4 will be engaged by the projection 147 on the die flange 146 and will be thereby pivoted about the pivot pin 142. This results in the actuation of the fourth limit switch 145-4. The fourth die 34-4 is thus identified as the one assigned to the storage location on the fourth or uppermost shelves 44-4 of the rack pair 43.

Figure 17:
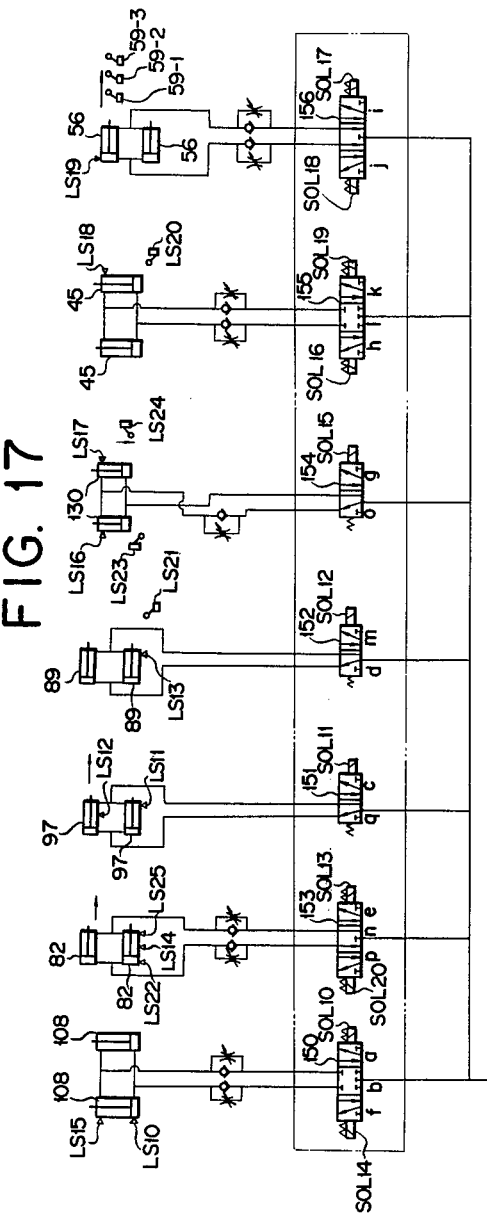
FIG. 17 is a diagrammatic representation of various fluid actuated cylinders used in the die changing apparatus, together with solenoid valves for controlling the operation of the cylinders.

In FIG. 17 are shown the various pairs of fluid actuated cylinders mentioned in the foregoing, together with solenoid valves for operating the cylinders. Also shown in FIG. 17 are various limit switches necessary for automatic operation of the die changing apparatus. These solenoid valves and limit switches will be referred to in the subsequent description of operation.

OPERATION

Figure 18:
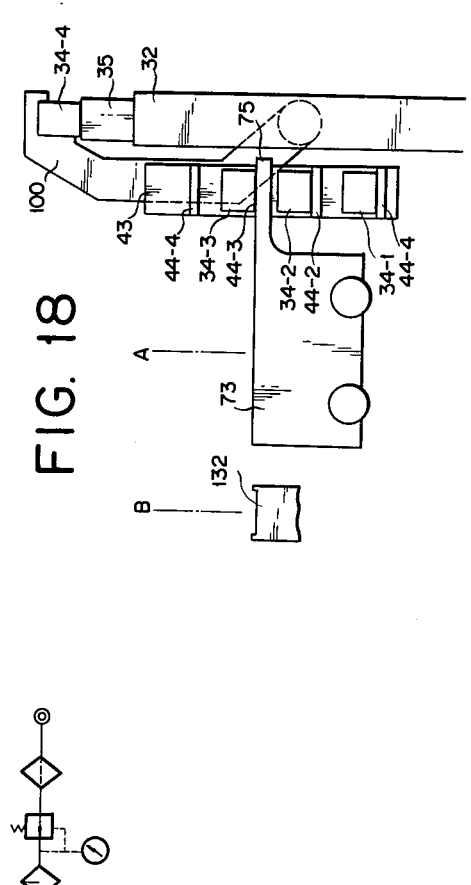

The following assumptions are made in starting the description of operation: (1) the fourth die 34-4 lies on the die bed 35, with its end grips 117 caught by the die clamping hooks 113 of the die changer arm pair 100; (2) the die carrier pair 73 is in the front position; and (3) the rack pair 43 is in such a position that the tongues 75 of the die carrier pair 73 are on a level with the third shelves 44-3 of the rack pair. FIG. 18 is illustrated on the foregoing assumptions. Described hereinbelow is the procedure of changing the dies from the fourth 34-4 to the third 34-3, following the completion of the bending operation by the fourth die.

A solenoid SOL10 on a three-position valve 150 seen in FIG. 17 is first energized to shift the valve to a position a thereby causing contraction of the die changer cylinder pair 108. This results in the swinging motion of the die changer arm pair 100 in the counterclockwise direction as seen in FIG. 19. During this counterclockwise swinging motion of the die changer arm pair 100, the cam follower lever 115 on each die changer arm rides over the corresponding one of the cam pair 119 bracketed to the guide structure pair 70 and is thereby pivoted against the bias of the corresponding extending spring 116. Thus released by the clamping hook pair 113, the fourth die 34-3 is deposited on the rear die rests 95 of the die carrier pair 73. The counterclockwise swinging motion of the die changer arm pair 100 continues thereafter until, at the predetermined end of the stroke shown in FIG. 19, a limit switch LS10 is actuated to deenergize the solenoid SOL10 on the valve 150 and hence to cause the latter to shift to a neutral position b.

As assumed above, the rack pair 43 is now so positioned that the tongues 75 of the die carrier pair 73 are on a level with the third shelves 44-3 of the rack pair. This means that each of the pair of movable stops 51 is so positioned by its stop cylinder 56 that the corresponding toothed bar 46 rests on its lowermost abutment 54-3. The tongues 75 of the die carrier pair 73 are ready to take out of the rack pair 43 the third die 34-3 overlying their front die rests 94.

A solenoid SOL11 on a two-position valve 151 is then energized to shift the valve to a position c thereby causing contraction of the die retainer cylinder pair 97. This results in the rotation of the shaft 93 on each die carrier 73 in such a direction that the front 91 and the rear 92 die retainer pawl pairs thereon are pivoted upwardly to their working positions thereby retaining the third 34-3 and the fourth 34-4 dies on the front 94 and the rear 95 die rests. Limit switches LS11 and LS12 are actuated upon full contraction of the die retainer cylinder pair 97.

A solenoid SOL12 on a two-position valve 152 is then deenergized to shift the valve to a position d thereby causing extension of the retractable stop cylinder pair 89. This results in the movement of the retractable stop pair 88 to the working position, which fact is sensed by a limit switch LS13.

A solenoid SOL13 on a three-position valve 153 is then energized to shift the valve to a position e thereby causing contraction of the die carrier cylinder pair 82. This results in the swinging motion of the die carrier drive lever pair 78 in the counterclockwise direction, as seen in FIG. 3 for example, thereby causing the die carrier pair 73 to roll rearwardly along the respective guideways 72. The rearward travel of the die carrier pair 73 continues until the short lever pair 90 is engaged by the retractable stop pair 88. The die carrier pair 73 thus reaches the intermediate position as shown in FIG. 20, whereupon a limit switch LS14 provided to one of the die carrier cylinders 82 is actuated.

With the die carrier pair 73 thus moved to the intermediate position, the third die 34-3 on the front die rests 94 is now held in position A to be clamped by the clamping hooks 113 on the die changer arm pair 100, as depicted in FIG. 20. The fourth die 34-4 on the rear die rests 95 of the die carrier pair 73 is now held in position B to be lifted by the die lifter mechanism pair 39.

A solenoid SOL14 on the valve 150 is then energized to shift the valve to a position f thereby causing extension of the die changer cylinder pair 108. As a consequence, the die changer arm pair 100 is swung in the clockwise direction, from its FIG. 20 position to that shown in FIG. 21. As the free ends of the die changer arms 100 travel past the cams 119 on the guide structures 70 on their way from the FIG. 20 to FIG. 21 position, the cam follower levers 115 and therefore the clamping hooks 113 on the die changer arm pair are pivoted by the cams against the bias of the extension springs 116. The clamping hooks 113 on the die changer arm pair 100 are thus permitted to engage the respective end grips 117 of the third die 34-3.

Figure 21:
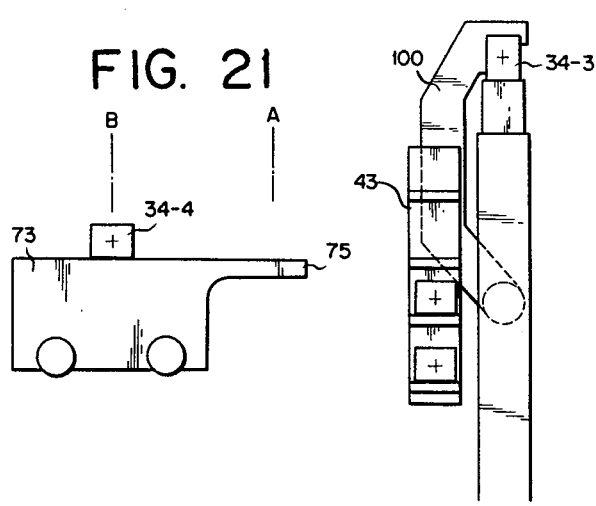

As the cam follower levers 115 ride off the cams 119 with the continued swinging motion of the die changer arm pair 100 in the clockwise direction, the clamping hooks 113 are urged by the extension springs 116 into positive engagement with the end grips 117 of the third die 34-3. This third die is subsequently mounted in position on the die bed 35, as shown in FIG. 21, and is thus made ready for a desired bending operation. A limit switch LS15 is actuated upon full extension of the die changer cylinder pair 108.

The die changing operation is, in a limited sense of the term, now completed. The following procedure can be performed in the course of the bending operation by use of the third die 34-3.

Figure 22:
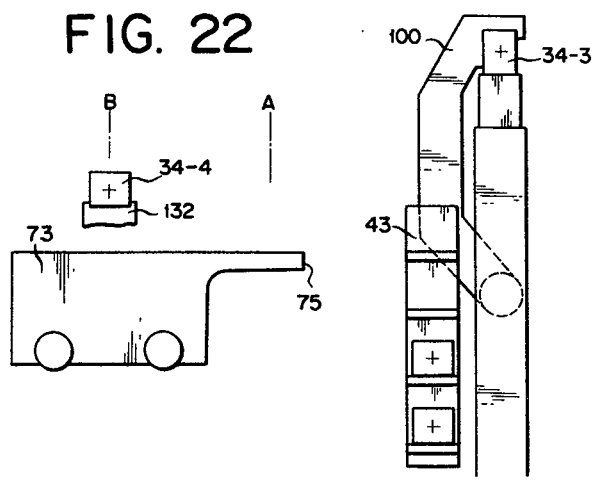

A solenoid SOL15 on a two-position valve 154 is energized to shift the valve to a position g thereby causing extension of the die lifter cylinder pair 130. Thereupon, as shown in FIG. 22, the fourth die 34-4 is lifted from the rear die rests 95 of the die carrier pair 73 by the die support pair 132. Limit switches LS16 and LS17 provided to this cylinder pair are actuated upon full extension of the die lifter cylinder pair 130.

As the fourth die 34-4 is lifted as above by the die lifter mechanism pair 39, the projection 147 on the flange 146 of the die moves into engagement with the fourth identifier arm 143-4 of the die identifier mechanism 40. Pivoted about the pivot pin 142 by the die projection 147, the fourth identifier arm 143-4 actuates the fourth limit switch 145-4. The identity of the fourth die 34-4 is thus ascertained.

Simultaneously, a solenoid SOL16 on a three-position valve 155 is energized to shift the valve to a position h thereby causing extension of the rack cylinder pair 45. The pair of racks 43 are raised to the predetermined uppermost position by the extended rack cylinders 45 along the guideways 42, as shown in FIG. 23. A limit switch LS18 is actuated upon full extension of the rack cylinder pair 45.

A solenoid SOL17 on a three-position valve 156 is then energized to shift the valve to a position i thereby causing contraction of the stop cylinder pair 56. This results in the sliding motion of each of the pair of movable stops 51 along its guideway 52 in a direction away from the corresponding one of the toothed bars 46. Upon full contraction of the stop cylinder pair 56, a limit switch LS19 provided to one of the stop cylinders is actuated, whereas the above mentioned three limit switches 59-1 through 59-3 are all turned off.

Should any one other than the fourth 34-4 of the interchangeable dies 34-1 through 34-4 be now held by the die lifter mechanism pair 39, a solenoid SOL18 on the valve 156 would then be energized to shift the valve to a position j thereby causing extension of the stop cylinder pair 56 and hence the movement of the movable stop pair 51 toward the respective toothed bars 46. In this particular instance, however, the solenoid SOL18 is not actuated because the fourth limit switch 145-4 of the die identifier mechanism 40 is actuated as aforesaid by the fourth die 34-4 being lifted by the die lifter mechanism pair 39. Instead, a solenoid SOL19 on the valve 155 is energized to shift the valve to a position k thereby causing contraction of the rack cylinder pair 45.

The rack pair 43 is thus lowered from the uppermost position of FIG. 23 to the lowermost position shown in FIG. 24. Since the pair of movable stops 51 are now both held fully retracted by the stop cylinder pair 56, the toothed bars 46 fastened to the rack pair 43 are allowed to descend past all the three abutments 54-1 through 54-3 of the movable stop pair, until the rack pair reaches the lowermost position in which the tongues 75 of the die carrier pair 73 are on a level with the fourth or uppermost shelves 44-4 of the rack pair. A limit switch LS20 is actuated upon full contraction of the rack cylinder pair 45, with the result that the solenoid SOL19 becomes deenergized to permit the valve 155 to shift to a neutral position 1. The fact that each rack 43 is correctly positioned as above is sensed by the corresponding limit switch 62 (FIG. 4) as then its actuator arm 65 becomes engaged in the uppermost notch 64-4 of the upstanding bar 63 movable up and down with the rack.

Let it be assumed, for the facility of understanding, that the first die 34-1 instead of the fourth die 34-4 is now held by the die lifter mechanism pair 39 and is identified as such by the die identifier mechanism 40. The stop cylinder pair 56 would then be extended to cause the movable stop pair 51 to travel toward the respective toothed bars 46. Upon actuation of the limit switch 59-3 by the edge 61-3 of the plate member 60 fastened to one of the movable stops 51, the solenoid SOL18 on the valve 156 would become deenergized to terminate the extension of the stop cylinder pair 56.

With the uppermost abutments 54-1 of the movable stop pair 51 thus brought under the respective toothed bars 46, the subsequent descent of the rack pair 43 would be arrested in the position where the tongues 75 of the die carrier pair 73 are on a level with the first or lowermost shelves 44-1 of the rack pair.

The solenoid SOL12 on the valve 152 is then energized to shift the valve to a position m thereby causing contraction of the retractable stop cylinder pair 89. This results in the retraction of the retractable stop pair 88. A limit switch LS21 is actuated upon full contraction of the retractable stop cylinder pair 89.

The solenoid SOL13 on the valve 153 is then energized to shift the valve to the position e thereby causing further contraction of the die carrier cylinder pair 82. Since the retractable stop pair 88 has been retracted as above, the die carrier pair 73 is allowed to travel rearwardly with the further contraction of the die carrier cylinder pair 82, until each die carrier drive lever 78 becomes engaged by the corresponding rear stop 87. A limit switch LS22 is actuated upon full contraction of the die carrier cylinder pair 82, resulting in the deenergization of the solenoid SOL13 and in the consequent return of the valve 153 to a neutral position n. In FIG. 25 is shown the die carrier pair 73 shifted as above to the rear position, in which the front die rests 94 of the die carrier pair underlie the fourth die 34-4 being lifted by the die lifter mechanism pair 39.

The solenoid SOL15 on the valve 154 is then deenergized to allow the valve to shift to a position o thereby causing contraction of the die lifter cylinder pair 130. The die support pair 132 coupled to the piston rods of the die lifter cylinder pair 130 is thus lowered, depositing the fourth die 34-4 on the front die rests 94 of the die carrier pair 73 as shown in FIG. 26. This results in the actuation of limit switches LS23 and LS24. The fourth die 34-4 deposited on the front die rests 94 of the die carrier pair 73 is of course caught between the front pairs of retractable die retainer pawls 91.

Figure 27:
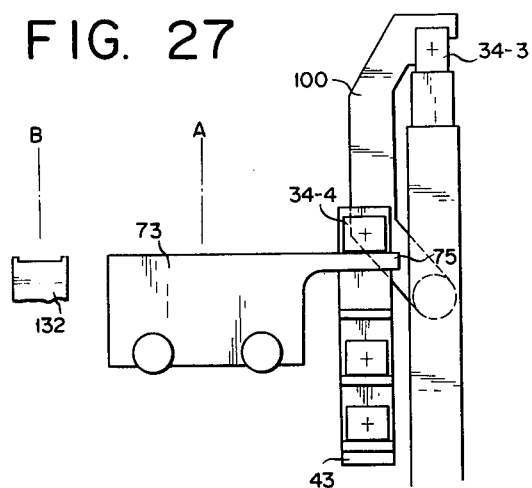

A solenoid SOL20 on the valve 153 is then energized to shift the valve to a position p thereby causing extension of the die carrier cylinder pair 82. This results in the swinging motion of the die carrier drive lever pair 78 in the clockwise direction. Since the retractable stop pair 88 is now held retracted, the die carrier pair 73 is allowed to travel from the rear position of FIG. 26 to the front position of FIG. 27 with the extension of the die carrier cylinder pair 82. The fourth die 34-4 on the front die rests 94 of the die carrier pair 73 is now received in the preassigned storage location on the fourth shelves 44-4 of the rack pair 43. Upon full extension of the die carrier cylinder pair 82, a limit switch LS25 is actuated to deenergize the solenoid SOL20 on the valve 153 and hence to allow the valve to return to the neutral position n.

The operation of changing the dies from the fourth 34-4 to the third 34-3 may now be considered to be completed. For the ready commencement of the next die changing operation, however, the following procedure should preferably be performed immediately following the return of the fourth die 34-4 into its preassigned storage location in the rack pair 43.

With the solenoid SOL11 deenergized, the valve 151 is shifted to a position q thereby causing extension of the die retainer cylinder pair 97. The result is the retraction of both the front 91 and the rear 92 pairs of die retainer pawls on each die carrier 73. Concurrently, the solenoid SOL12 is deenergized to shift the valve 152 to the position d thereby causing extension of the retractable stop cylinder pair 89. The retractable stop pair 88 is thereupon shifted to the working position.

Figure 28:
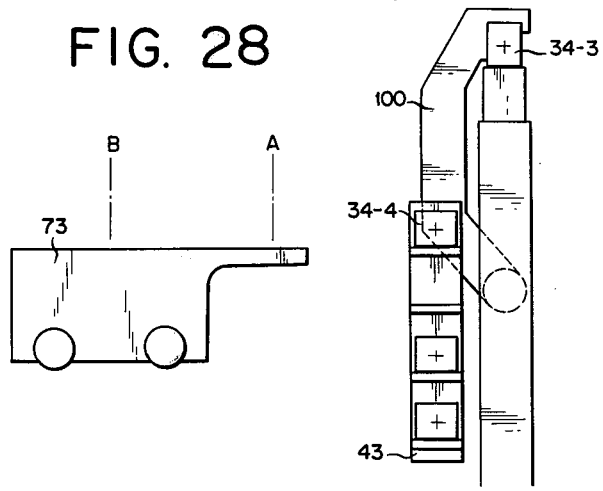

The limit switch LS13 is actuated upon full extension of the retractable stop cylinder pair 89, with the result that the solenoid SOL13 is energized to shift the valve 153 to the position e. With the consequent contraction of the die carrier cylinder pair 82, the die carrier pair 73 is shifted from the front position of FIG. 27 to the intermediate position of FIG. 28, leaving the fourth die 34-4 on the fourth shelves 44-4 of the rack pair 43.

Figure 29:
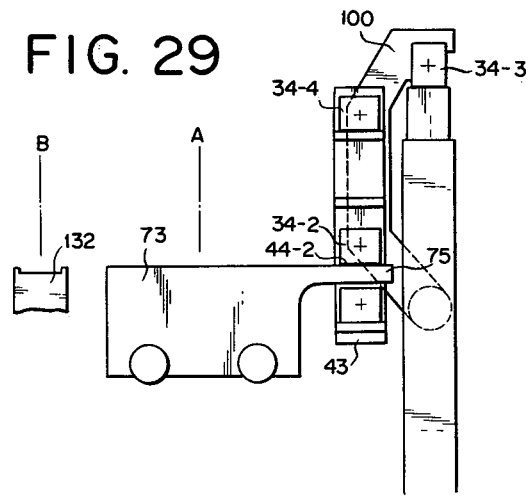

The position of the rack pair 43 is then changed in the vertical direction in the above described manner. If the third die 34-3 now in use for bending operation on the die bed 35 is to be subsequently replaced by the second die 34-2, for instance, then the rack pair 43 may be elevated to the position where the tongues 75 of the die carrier pair 73 are on a level with the second shelves 44-2 of the rack pair. The die carrier pair 73 is then returned to the front position, as shown in FIG. 29. The die carrier pair 73 is now ready to receive the third die 34-3 on the rear die rests 95 and further to carry the second die 34-2 out of the rack pair 43.

Other Components of the Bending Brake

Various other components of the bending brake set forth hereinbelow with reference to FIGS. 1 and 2 fall outside the purview of this invention. Such components will therefore be described briefly, only insofar as is necessary to make clear their interaction with the invention.

Generally designated 160 in FIG. 2 is one of a pair of blank positioning mechanisms for holding a blank (not shown) in position on the die 34 on the bed 35. The illustrated blank positioning mechanism 160 includes a stop 161 mounted on a carriage 162 via a height adjustment 163. Guided by a guide 164, the carriage 162 is adjustably moved in the front-to-rear depth direction of the brake by a feed screw 165 with which the carriage is threadedly engaged.

The bending brake is further equipped with punch changing apparatus for making selevetive use of a plurality of interchangeable punches 33-1, 33-2, 33-3 and 33-4. The punch changing apparatus includes a pair of pivotable and vertically movable punch changer arms 170 capable of simultaneously holding two punches such as the punches 33-1 and 33-2. One 33-1 of these two punches held by the punch changer arm pair 170 is clamped at 171 under the ram 31 for bending operation, whereas the other punch 33-2 is standing by for immediate replacement of the punch 33-1.

The pair of punch changer arms 170 are associated respectively with a pair of fluid actuated cylinders 172 (hereinafter referred to as the punch changer cylinders) each having punch gripping means 173 mounted on its piston rod 174. Each punch changer cylinder 172 is mounted on a carriage 175 which is moved along a guide 176 by a feed screw 177 with which the carriage is threadedly engaged. The punch changer cylinder pair 172 is thus enabled to select any desired one of the interchangeable punches 33-1 through 33-4 held in preassigned storage locations on a pair of racks 178 and to transport and deposit the desired punch on the punch changer arm pair 170.

For changing the punches from 33-1 to 33-2, the punch 33-1 is first unclamped, and the punch changer arm pair 170 is lowered to a predetermined degree together with the two punches 33-1 and 33-2. The punch changer arm pair 170 is then pivoted 180 degrees and is then raised to cause the desired new punch 33-2 to be clamped under the ram 31. The punch 33-1 which has been thus replaced is then gripped by the punch gripping means 173 on the piston rods 174 of the punch changer cylinder pair 172 and is thereby transported and returned to its preassigned storage location on the rack pair 178.

It is thus seen that a self-contained bending brake is provided which is capable of automatically making selective use of the interchangeable punches 33-1 through 33-4 and the interchangeable dies 34-1 through 34-4. By selected combinations of these interchangeable punches and dies, various bending or forming operations can be performed in any desired sequence.

Although this invention has been shown and described in terms of its preferable embodiment, it is to be understood that the invention is not limited to the precise embodiment and that various changes and modifications may be effected therein by one skilled in the art without departing from the spirit or scope of the invention as expressed in the following claims.

I claim:

1. In a bending brake, apparatus for making selective use of a preselected number of interchangeable dies, comprising:
   (a) frame means;
   (b) a die bed fixedly mounted on the frame means for supporting thereon any selected one of the dies for bending operation;
   (c) rack means movably mounted on the frame means and adapted to hold the preselected number of dies in respective preassigned storage locations therefor;
   (d) die carrier means disposed opposite to the rack means for movement toward and away from same, the die carrier means being adapted to carry a desired one of the dies out of the rack means;
   (e) die changer means for transporting a die to be replaced from the die bed on to the die carrier means and for transporting the desired die which has been carried out of the rack means by the die carrier means from the latter on to the die bed; and
   (f) die identifier means for ascertaining the identity of the replaced die and for causing the rack means to receive the replaced die in its preassigned storage location as the replaced die is carried back into the rack means by the die carrier means.

2. The apparatus according to claim 1, wherein the rack means comprises a pair of rack assemblies disposed one adjacent each side of the frame means, each rack assembly comprising:
   (a) rack guide means fixedly mounted on the frame means;
   (b) a rack constrained by the rack guide means to vertical movement relative to the frame means, the rack having means for supporting the preselected number of dies in a vertical series, with each die extending horizontally;
   (c) means for moving the rack along the rack guide means; and
   (d) means for arresting the movement of the rack in predetermined positions for permitting the die carrier means to carry the desired die out of its preassigned storage location and to carry the replaced die back into its preassigned storage location.

3. The apparatus according to claims 1 or 2, wherein the die carrier means comprises a pair of die carrier mechanisms disposed one adjacent each side of the frame means, each die carrier mechanism comprising:
   (a) die carrier guide means fixedly mounted on the frame means;
   (b) a die carrier constrained by the die carrier guide means to horizontal movement toward and away from the rack means; and
   (c) means for moving the die carrier along the die carrier guide means.

4. The apparatus according to claim 3, wherein the pair of die carriers of the die carrier mechanisms have first and second die rests for holding dies thereon, and wherein the pair of die carrier mechanisms further comprise means for arresting the movement of the die carriers in a first position where the desired die in the rack means overlies the first die rests of the die carriers and where the die to be replaced is deposited on the second die rests of the die carriers by the die changer means, in a second position where the desired die is transported from the first die rests of the die carriers on to the die bed by the die changer means and where the replaced die is identified by the die identifier means, and in a third position where the replaced die is placed on the first die rests of the die carriers to be thereby carried back into the rack means.

5. The apparatus according to claim 4, wherein the pair of die carrier mechanisms further comprise die retainer means movable between working and retracted positions, the die retainer means when in the working position being effective to retain the dies on the first and the second die rests of the die carriers.

6. The apparatus according to claim 4, further comprising die lifter means for lifting the replaced die from the second die rests of the die carriers when they are moved from the first to the second position and for lowering the replaced die on to the first die rests of the die carriers when they are moved from the second to the third position.

7. The apparatus according to claim 6, wherein each of the preselected number of interchangeable dies has a characteristically shaped portion thereon, and wherein the die identifier means comprises a plurality of electrical switches adapted to be selectively actuated by the characteristically shaped portion of the replaced die when same is lifted from the second die rests of the die carriers by the die lifter means.

8. The apparatus according to claim 1, wherein the die changer means comprises:
   (a) a pair of die changer arms disposed one adjacent each side of the frame means and both pivotally mounted thereon;
   (b) means on the free ends of the die changer arms for clamping each die; and
   (c) means for pivotally moving the die changer arms.

9. The apparatus according to claim 8, wherein the die changer means further comprises cam means for causing the clamping means of the die changer means to unclamp the die to be replaced when same is transported on to the die carrier means and to clamp the desired die when same is to be transported from the die carrier means.

10. In a bending brake, apparatus for making selective use of a preselected number of interchangeable dies each having a characteristically shaped portion, comprising:
    (a) frame means;

(b) a die bed on the frame means for supporting thereon any selected one of the dies for bending operation;

(c) rack means mounted on the frame means for movement in the vertical direction relative to same and adapted to hold the preselected number of dies in respective preassigned storage locations therefor which are arranged in a vertical series, the movement of the rack means being arrested in a plurality of predetermined positions;

(d) die carrier means disposed opposite to the rack means for movement toward and away from same, the die carrier means being adapted to carry a desired one of the dies out of its preassigned storage location in the rack means while the latter is held in one of the predetermined positions;

(e) die changer means for transporting a die to be replaced by the desired die from the die bed on to the die carrier means and for transporting the desired die which has been carried out of the rack means by the die carrier means from the latter on to the die bed;

(f) die lifter means for temporarily lifting the replaced die from the die carrier means; and (g) die identifier means for ascertaining the identity of the replaced die from its characteristically shaped portion while the replaced die is being lifted from the die carrier means by the die lifter means, the die identifier means being effective to cause the rack means to move to another of the predetermined positions for receiving the replaced die in its preassigned storage location as the replaced die is carried back into the rack means by the die carrier means.

11. The apparatus according to claim 10, wherein the rack means, the die carrier means, the die changer means and the die lifter means are all activated by fluid actuated cylinders under the control of solenoid valves.

* * * * *